(No Model.) 2 Sheets—Sheet 2.

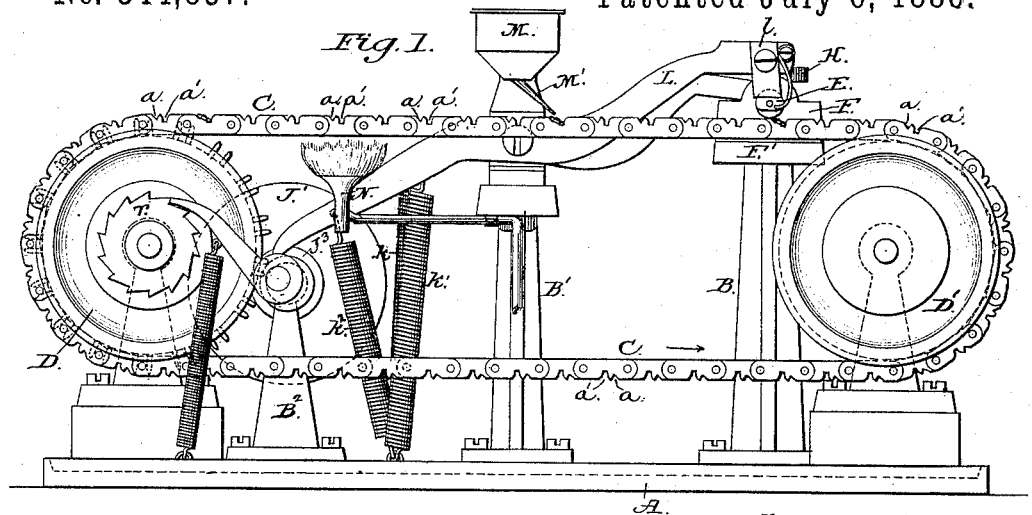

J. JENKINS & E. H. GAYLORD.
SAFETY PIN MACHINE.

No. 344,837. Patented July 6, 1886.

Attest:
John A. Ellis
A. B. Moore

Inventors:
Joel Jenkins
Elam H. Gaylord
By David A. Burr
Atty.

United States Patent Office.

JOEL JENKINS, OF MONTCLAIR, NEW JERSEY, AND ELAM H. GAYLORD, OF WATERBURY, CONNECTICUT; SAID ELAM H. GAYLORD ASSIGNOR TO SAID JOEL JENKINS.

SAFETY-PIN MACHINE.

SPECIFICATION forming part of Letters Patent No. 344,837, dated July 6, 1886.

Application filed November 27, 1885. Serial No. 184,016. (No model.)

*To all whom it may concern:*

Be it known that we, JOEL JENKINS, of Montclair, in the county of Essex and State of New Jersey, and ELAM H. GAYLORD, of Waterbury, in the county of New Haven and State of Connecticut, have invented a new and useful Improvement in Machines for the Manufacture of Safety-Pins; and we do hereby declare that the following is a full and exact description thereof, reference being had to the accompanying drawings, and to the letters of reference marked thereon, making a part of this specification.

Our invention relates to machines for the manufacture of safety-pins, and has for its object the automatic soldering of the heads upon the pins.

Figure 5:
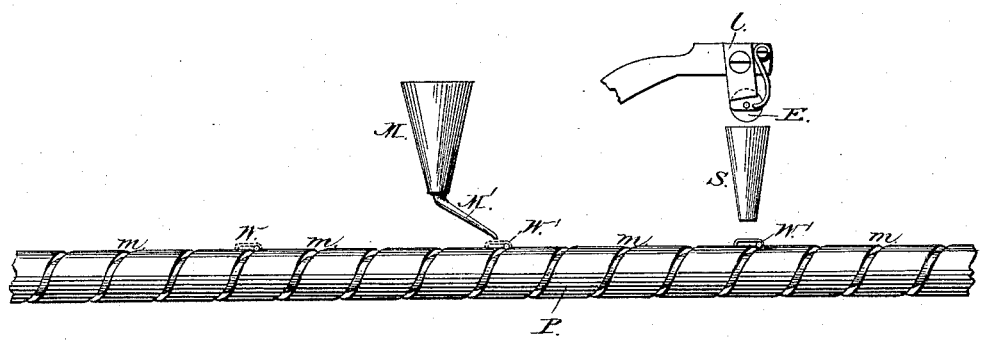

In the accompanying drawings, Figure 1 is a side elevation of our soldering-machine for safety-pins; Fig. 2, a plan view of the same; Fig. 3, a transverse section, on an enlarged scale, in line $x\,x$ of Fig. 2; Fig. 4, a detailed section, on an enlarged scale, in line $y\,y$ of Fig. 2; Fig. 5, a plan view of a modification of our invention, illustrating its application as an attachment to the machine for heading safety-pins, for which a separate application for Letters Patent bearing even date herewith has been made; and Fig. 6 an elevation, partly in section, of the machine as shown in Fig. 5.

A represents the base or bed plate of the machine, its operative parts being mounted in a suitable frame or upon a series of pedestals, B B' B², secured upon the bed-plate A.

C is an endless carrying-chain, carried over sprocket-wheels D D', to move in horizontal planes between them. The links of this chain are constructed of flat plates hinged together end to end, as shown in Fig. 1, and arranged in two parallel rows at a suitable distance apart (see Fig. 2) to afford transversely a suitable support for the safety-pins, the two rows being connected by transverse pivot-pins and held apart uniformly by interposed collars fitted upon said pins in the usual manner. The upper edges of the links are notched uniformly at regular intervals apart with notches $a\,a'$, arranged in pairs at a distance apart equal to that separating the two arms of the safety-pins, and the rear notch, $a'$, in each pair is cut deeper than that in front of it, whereby a pin resting in the notches is held with its head at an inclination, as shown in Figs. 1 and 3.

E represents a tubular guide-block, fitted longitudinally at a right angle to the carrying-chain C within an aperture in a head-block, F, at one end of a base-plate, F', mounted upon a pedestal, B, so as to support the guide at a level somewhat above the upper length of the horizontally-moving carrying-chain. The guide-block E admits of a longitudinal adjustment in its supporting-block F to and from the chain, and is fixed when adjusted by means of a set-screw, $b$. (See Fig. 3.)

G is a feed-block, fitted to move horizontally to and from the head-block F in line with the axis of the guide E within a recess cut out in the base-plate F'. The head-block F is formed with a horizontal offset, $e$, projecting with its top face in line with the axis of the central longitudinal aperture in the guide E, and a semi-cylindrical groove, $d$, is cut in said face in a right line with said aperture and of the same diameter. The top face of the reciprocating feed-block G is made flush with the bottom of said groove $d$. A stud-pin, $g$, projects vertically from the center of the feed-block, and a hole is pierced diametrically through it in line with the groove $d$, and on a level therewith. A washer, $f$, is fitted over the stud-pin, to rest upon spiral springs $g^2\,g^2$, inserted between the washer and the block in recesses cut in the face of the latter. (See Fig. 4.) The upper end of the stud-pin $g$ is embraced by the slotted end of a lever, H, of the first class, pivoted centrally upon a pedestal, B', and whose opposite end is made to bear upon a double cam-wheel, H', carried by a horizontal shaft, J, mounted on pedestals B² B² at a right angle to the carrying-chain C. An offset, $h$, is formed upon the periphery of this cam-wheel H', so that the inner end of the lever H, bearing on said periphery is made thereby to oscillate in a vertical plane sufficiently to cause its outer end to force the washer $f$ down upon the feed-block G. The inner end of the lever is held down upon the periphery of the cam by means of a spring, $k$, which is is also made to draw it laterally against the lateral face of a flange, $i$, projecting radially from the wheel, this lateral face of the flange being made of varying width to serve as a cam, operating in the rotation of the wheel to produce a lateral reciprocating movement of the lever sufficient to cause its outer end, by reason of its engagement with the stud-pin $g$, to move the feed-block at regular intervals to and from the head-block. The two cam-surfaces $h$ and $i$ on the wheel $H'$ are so adjusted relatively as that the washer $f$ will be forced down and held down upon the feed-block G, while the latter is moving toward the head-block F, and be released and left free while the feed-block is moving back. The extent of the movement of the feed-block is limited and adjusted by means of a set-screw, $G'$, carried horizontally through a fixed block, $G^2$, to bear against the end of the lever H. (See Fig. 2.)

K is a second lever of the first class mounted parallel with the lever H, in line with the offset $e$ of the head-block, and which is pivoted upon the top of the pedestal $B'$, so that its outer end may rest upon said offset over the groove therein. Its inner end is made to bear, by means of a spring, $k'$, upon the periphery of a cam-wheel, $K'$, fitted upon the shaft J. The cam upon the periphery of the wheel $K'$ is so proportioned and so adjusted relatively to the cams $h$ and $i$ upon the wheel $H'$ as that the outer end of the lever K will be forced down upon the face of the offset $e$ of the head-block during the interval in which the feed-block G is moving back therefrom. Yet another lever, L, of the first class is pivoted centrally upon the top of the pedestal $B'$ to oscillate in a vertical plane parallel with the lever K. The outer end of this lever is fitted with a knife, $l$, adapted to reciprocate in the movement of the lever across the end of the guide-block E. The inner end of the lever is made to bear upon the periphery of a cam-wheel, $K^2$, upon the shaft J, by means of a spring, $k^2$, and the cam is so proportioned and so adjusted relatively to the cams on the wheels $H'$ and $K'$, as that the knife $l$ on the outer end of the lever L will be carried across the end of the guide-block E so soon as the feed-block G has completed its movement toward the head-block F.

The driving-wheel $J'$ of the machine is fitted upon one end of the shaft J. A pawl, $J^2$, is pivoted upon a wrist-pin on the face of a wheel, $J^3$, at its opposite end. This pawl engages ratchet-teeth encircling the enlarged hub $r$ of the sprocket-wheel D, at one end of the carrying-chain C, and the rotation of the shaft J is thereby made to produce an intermittent rotation of the sprocket-wheel and a consequent intermittent movement of the carrying-chain C. The wheel $J^3$, carrying the pawl $J^2$, is so adjusted upon the shaft relatively to the cam upon the wheel $K^2$ as that a movement of the carrying-chain is produced by the action of the pawl immediately after the reciprocating movement of the knife $l$ is completed.

M, Fig. 1, represents an acid-reservoir of any suitable form, provided with a small delivery-tube, $M'$, extending thence to a point in the vertical plane parallel with the chain C, in which the knife $l$ moves, and at a level slightly above that of the upper length of the chain.

N represents a burner adapted to produce an extended flat flame parallel with the chain C, and in the same vertical plane with the knife $l$ and the end of the acid-tube $M'$, but far enough from said tube as not to heat the same unduly.

In the operation of the machine the safety-pins W W, duly bent and headed and having their heads retained in place by the elasticity of the bent arms of the pin, upon whose outer ends the head is fitted, are severally placed, as shown in Fig. 2, transversely upon the carrying-chain C, in the double notches $a\ a'$, upon its upper edges, the differences in depth of the double notches causing the head of the pin to assume an inclined position so that the end of the arm to be soldered to the head is lower than the end of the free arm. In this position the pins are carried forward by the intermittent movement of the chain and successively brought to a stop, each with its headed end, first, immediately under the knife $l$, next under the end of the acid-tube $M'$; and, third, over the burner N. A strip of solder drawn in the form of a wire, T, (see Fig. 3,) is led through the aperture in the stud-pin $g$, and under the washer $f$; thence to and along the groove $d$ on the offset $e$ of the head-block F under the end of lever K, and thence out through the longitudinal aperture in the guide-block E, as shown in Fig. 3. During each movement of the carrying-chain C, produced by the action of the pawl $J^2$ upon the sprocket-wheel D, the feed-block G is made, by the movement of the lever H, actuated by the cam-wheel $H'$ on the driving-shaft J, to slide toward the head-block F, and as the washer $f$ is in the meantime forced down upon the solder wire under it, the wire is carried forward with the feed-block so that its outer end will be made to project out beyond the outer end of the guide-block E to an extent proportionate to the length of movement of the feed-block. So soon as the wire T has thus been fed forward and the feed-block is about to move back, the washer $f$ is released from the wire and simultaneously the end of the lever K is brought to bear upon the latter to hold it firm. The carrying chain having in the meantime completed its movement, and having carried the head of a pin under the knife $l$, the knife moves across the end of the guide-block and severs the projecting end of the solder wire. This severed bit of solder drops into the recess in the pin-head, and, by reason of the inclination of the head, rolls down next to the end of the arm which is to be made fast to the head. In the meantime the feed-block returns to take another hold upon the solder wire to feed it forward again during the next movement of the chain, which takes place as soon as the knife *l* has completed its movement. At the next movement of the chain C, the pin, having a bit of solder placed in its head, is carried under the end of the acid-tube M', and during the next intermission in the movement of the chain receives a small drop of acid upon the solder. At the next movement of the chain the pin, having the bit of solder in its head moistened with acid, is carried over the burner N, and during the next intermission the solder is melted by the heat of the burner, and by reason of the inclination of the head the molten solder flows about the end of the arm to be secured, and away from the opposite arm, and in this condition is carried at the next movement of the chain away from the burner to solidify and complete the operation of making fast the head of the pin. It is evident that the acid-tube may be conducted to a point under the knife *l* so as to moisten the solder so soon as it drops into the pin-head, and also that various obvious devices may be substituted for those above described for feeding bits of solder to the pin-head, and hence we do not limit ourselves to the precise mode of supplying the solder, but contemplate the various methods well known to competent mechanics for the accomplishment of this result.

The headed pins may be placed upon the carrying-chain by hand, or delivered thereon automatically directly from the heading-machines now in use.

As a modification of my invention, the carrying-chain may be replaced by two parallel shafts, P P, (see Figs. 5 and 6,) spirally grooved, as at *m m*, to serve as conveyers or carriers for pin-blanks W' W', which have been previously fitted at one end with heads placed thereon in a heading-machine for which an application for Letters Patent, bearing even date herewith, will be filed. The shafts are mounted at a right angle to the aperture in the guide-block E through which the solder is fed, and in such proximity thereto as that the headed ends of the pin-blanks laid transversely in the grooves in the shaft shall pass under the knife *l*, or under a conducting-tube, S, leading therefrom in position to receive the bit of solder cut off by the knife. They are geared mediately or immediately to the cam-shaft J, so as to rotate continuously in unison therewith. The pin-blanks W' W', carried forward by the grooves, are arrested momentarily opposite the knife *l* to receive the solder, opposite the acid-tube to receive the acid, and over the burner to produce a fusion of the bit of solder in the head, by reason of a change in the course of the grooves *m m* at each of said points from a spiral course to a direction at right angles to the axis of the shaft, (see at *m' m'*, Fig. 6,) the changed course being continued around more or less of the periphery of the shaft, according to the interval during which it is designed that the blank shall remain stationary. The heads of the pins are supported in a horizontal position upon a strip, R, fitted longitudinally parallel with the inner shaft, and upon which they rest and slide as they are moved forward by the rotation of the shafts.

Figure 6:
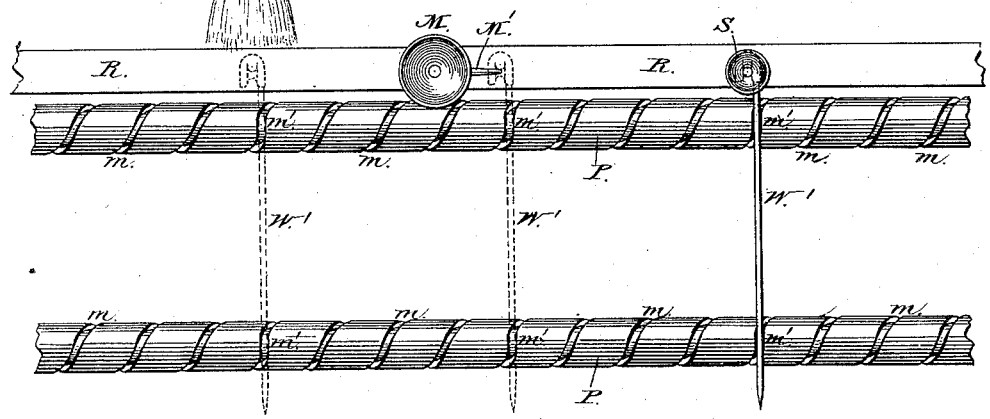

The flame from the burner N may be directed against the ends or upon the tops of the heads, as illustrated in Figs. 5 and 6, instead of from below, as shown in Fig. 1.

We claim as our invention—

1. The machine organized substantially as described, comprising a device delivering intermittently bits of solder, a reservoir and tube delivering drops of acid, and a burner or heating device for melting the bits of solder, in combination with conveying mechanism, substantially as described, for carrying forward and momentarily detaining in reach of each of said devices the headed ends of safety-pins placed upon said conveying mechanism, whereby a bit of solder and a drop of acid are automatically delivered upon each pin-head, and the solder thereafter fused thereon, substantially in the manner and for the purpose herein set forth.

2. The combination, with a solder-feeding device, an acid-feeding device, and a heating device, each constructed to operate substantially as described, of an endless carrier-chain constructed of a double set of flat links whose upper edges are notched to receive and retain the wire blanks for safety-pins, and which is made to revolve intermittently in line parallel with the solder device and burner, substantially in the manner and for the purpose herein set forth.

In testimony whereof we have signed our names to this specification in the presence of two subscribing witnesses.

JOEL JENKINS.
ELAM H. GAYLORD.

Witnesses:
   GEO. E. TERRY,
   GREENE KENDRICK.